(No Model.) 2 Sheets—Sheet 1.
S. FERGUSON.
HAY LOADER.
No. 488,732. Patented Dec. 27, 1892.
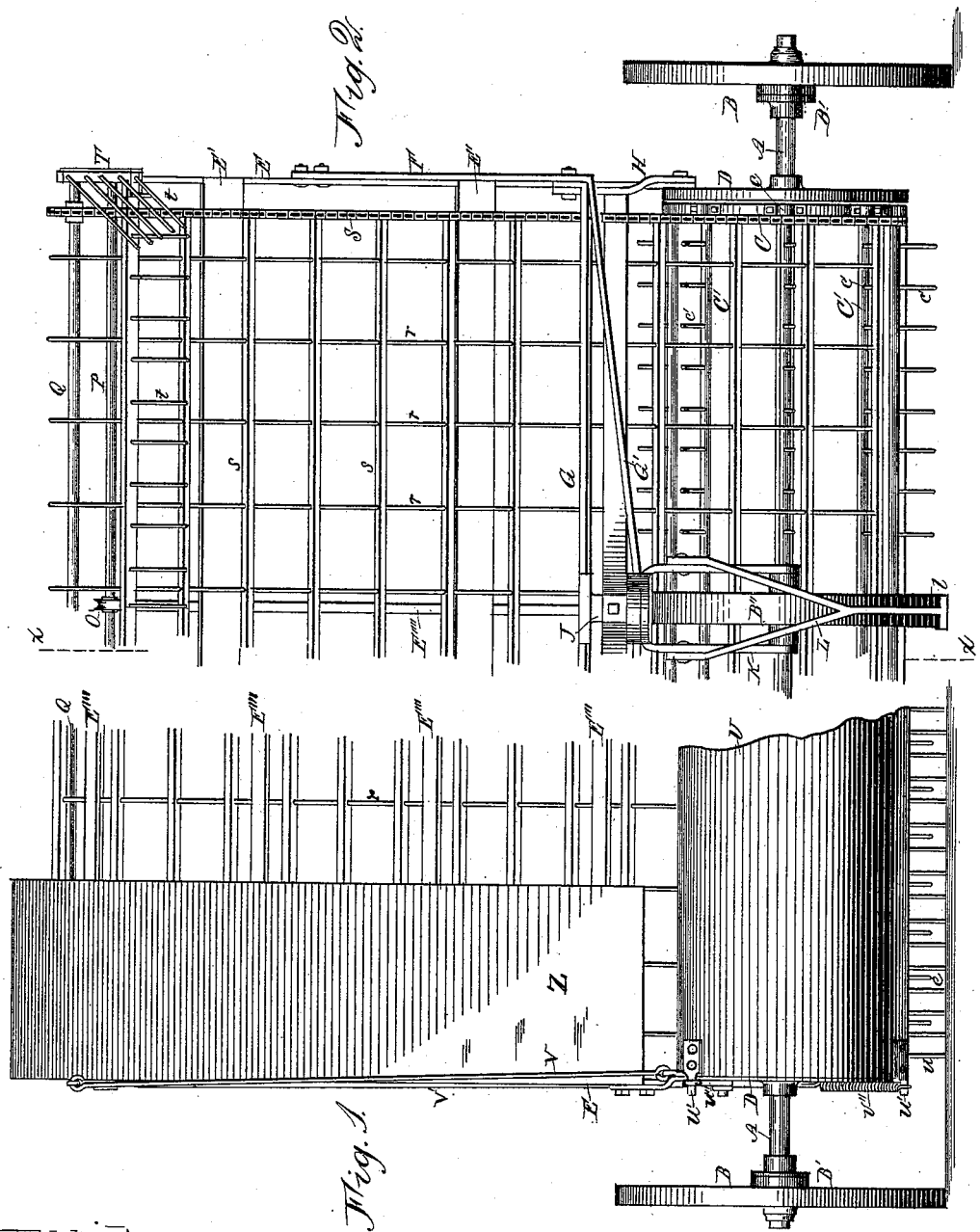

(No Model.) 2 Sheets—Sheet 2.
S. FERGUSON.
HAY LOADER.
No. 488,732. Patented Dec. 27, 1892.
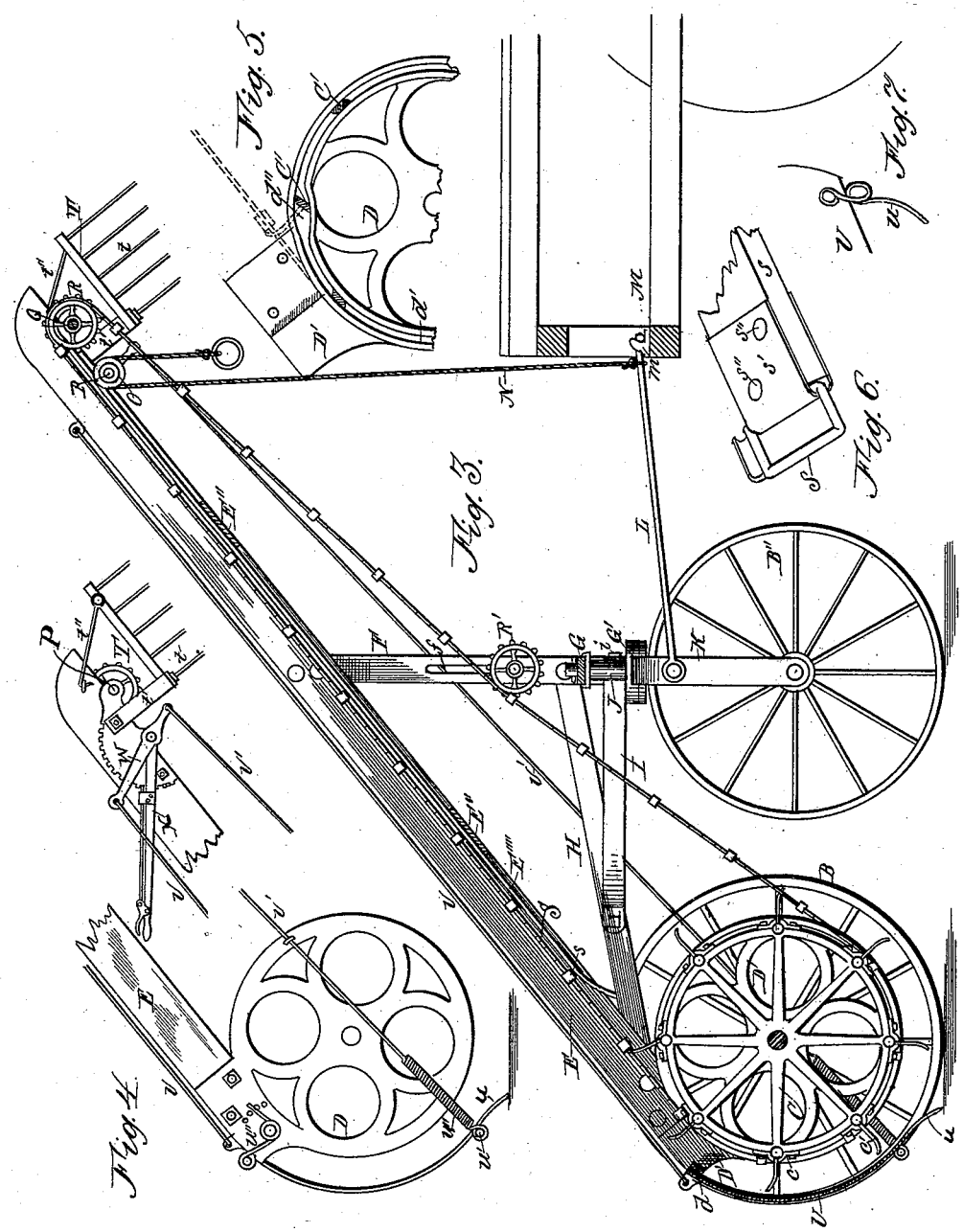

UNITED STATES PATENT OFFICE.

SAMUEL FERGUSON, OF CEDAR RAPIDS, IOWA.

HAY-LOADER.

SPECIFICATION forming part of Letters Patent No. 488,732, dated December 27, 1892.

Application filed May 24, 1892. Serial No. 434,125. (No model.)

*To all whom it may concern:*

Be it known that I, SAMUEL FERGUSON, a citizen of the United States, residing at Cedar Rapids, in the county of Linn and State of Iowa, have invented certain new and useful Improvements in Hay-Loaders; and I do hereby declare the following to be a full, clear, and exact description of the invention, such as will enable others skilled in the art to which it appertains to make and use the same.

The object of this invention is to so construct a hay-loader as to admit of the hay as cut being conveyed directly to the wagon without first raking into windrows; the mechanism therefor being simple, light-running and comparatively inexpensive.

The invention consists of the construction, combination and arrangement of parts, as hereinafter fully set forth and claimed.

In the accompanying drawings, forming a part of this specification, Figure 1 is fragmentary rear elevation, showing the side of the machine at the left; Fig. 2 is a front elevation of the same. Fig. 3, Sheet 2 is a vertical section of the machine, on the line $x\ x$ of Fig. 2. Fig. 4 is an elevation, showing the two ends of the conveyer and the connected rake. Fig. 5 is a fragmentary elevation of the cylinder head as seen from the inner side, the picker shafts being in section. Fig. 6 is a perspective view showing the connection of the elevator slats with the chain-belt. Fig. 7 shows a simple rake tooth and manner of connecting the same with the hood at the rear of the machine.

Similar letters of reference indicate corresponding parts.

Referring now to the drawings, A is the axle, which is quite long, and the machine is designed to rake a swath eight or nine feet wide, and it is desirable that the wheels B B should set out some distance beyond the rake, so as not to rest on any of the grass caught by the rake. A ratchet and pawl clutch B' of a common and well known type is provided for each wheel.

On the axle are secured two or more wheels or spiders C C (preferably three), in which is a series of boxes $c\ c$ in which are pivoted the picker shafts C' C' provided with a series of teeth $c'\ c'$. These parts are of such size and length that when the machine is in operation the points of the teeth reach nearly to the ground, as represented. This part of the machine, which may be designated as the cylinder, has the same revolution as the wheels, and its office is to pick up the hay gathered by the rake (to be hereinafter described) and deliver it to the elevator. The picker shafts have a partial revolution in their bearings, and their flattened ends travel in an annular groove $d'$ in the circular casting or head D at each end of the machine. By reference to Fig. 5 it will be seen that for a short distance near the top this groove has an enlargement $d''$, which permits the shaft to turn a limited distance so that the teeth may pass under the elevator slat $s$ and out of the flowing hay. As the shaft moves forward it is by the contraction of the groove restored to its normal position, radial to the cylinder. The teeth should be slightly curved near the outer ends, so as to the more readily pick up the hay in their passage.

The heads D D are mounted loosely on the axle A, and to them at the upper side are secured the sideboards E E of the elevator. For this purpose the casting has an extension D'. An offset therein admits of the inner face of the side-board being flush with the inner face of the casting, so there is nothing to catch the ends of the hay in its passage up the elevator.

About midway of its length the elevator is supported by a suitable framework on a guide-wheel B''. This frame consists of uprights F F secured at the upper ends to the sideboards; a trussed girder G G', one member of which may be a continuation of the uprights, and braces H and I. The former connect the uprights with the lower part of the elevator. The latter extends diagonally from the side-braces to the pivot-bearing J, where it is suitably secured by a screw or bolt $i$. This serves both to brace the frame against diagonal strains, and to stiffen the bearing for the pivoted fork K, between the legs of which the guide-wheel B'' is mounted in the usual manner.

To the fork is hinged a Y designated by the letter L, which serves as a draw-bar, and connects by a suitable T, or equivalent device, with a lug $m$ on the rear end of the rack M. A cord N, passing over a sheave O on the rock-shaft P at the upper end of the elevator admits of the draw-bar being disengaged by the operator while on the load by simply pulling down on the cord.

The conveyer consists of a series of slats $s\ s$ connected with chain-belts passing around the cylinder near the ends and sprocket wheels R at the upper end of the elevator, mounted on a shaft Q. The slack of the chains is taken up by a pair of sprocket wheels R', mounted, one on each side of the machine, on suitable studs adjustable in the slots $f$ in the uprights F.

In Fig. 6 is shown the manner of connecting the slats $s$ with the chain. It consists of a strap of thin band-iron passing over one side of the link, and riveted to the slat by rivets $s''\ s''$. The connection occupies little room, and the teeth of the sprocket-wheels being a little narrower than the opening in the chain operates therein without interference. This arrangement permits the use on the outer side of the chain-belts, of the tighteners above described. Intermediate cords $r\ r$ serve as an apron to support the hay in its movement up the elevator.

To prevent dislodgment of the hay in windy weather, the elevator may be provided with a complete or partial covering Z of canvas or light boards, supported on transverse strips $E'''$.

The width of the machine being somewhat more than that of the load, I provide the upper end of the elevator with a converging chute T tipping downwardly, and adapted to confine the hay as discharged within the limits of the load. This chute is composed of a rectangular frame T, to which are attached light rods $t\ t$, those at the ends inclining toward the center of the machine, as shown in Fig. 2. The chute is suspended from the upper end of the elevator by brackets $t'$ and rods $t''$.

Back of the cylinder, and a little outside the reach of the picker teeth is mounted the rake. This is composed of a partially cylindrical hood U of sheet metal or the like, to the lower edge of which are attached the rake teeth $u\ u$. As the work required of them is light, they may be quite small and short, the hood serving to hold the hay in place as carried up by the picker teeth already described. The hood should have a pivotal connection at or near its upper edge, and at or near the vertical line over the points of the teeth, so that the teeth in swinging back in striking an obstruction do not dig into the ground.

To the upper edge of the rake, at each end, I connect a rod $v$, which at the upper end connects with a lever or crank W secured to the rock-shaft P. A rod $v'$, connecting at the upper end with the opposite end of said crank, serves to hold the teeth of the rake to their work through the medium of a spring $v''$ connecting with the rod and rake. It is to be understood that one of these is provided for each side of the machine. A suitable hand-lever X secured to the rock-shaft P serves for adjustment of the rake to the work in hand, and for throwing it entirely out when not in use.

The hood is held at the ends by the lateral bearing of the casting extension D' and by lugs $d$ on the under side. As a further bearing, and for the additional purpose of holding the rake down to its work, the heads may be provided with springs $u''$, engaging with studs $u'$ secured to the hood. A form of rake-tooth and mode of attachment to the hood, are shown in Fig. 7. The rake tooth is composed of a rod or wire coiled midway, with an eye formed in the upper end, by which it is fastened to the hood by a rivet or bolt.

The loader as thus constructed is adapted from the nature of the case to take the hay from the swath and deposit it on the rack without having been previously raked into windrows. It thus passes in a moderate and continuous flow to the operator on the wagon, without the bunching and tangling common to loaders taking hay from the windrow. It will be evident also that the draft of the machine is very light, the machine itself not requiring much weight in any of its parts.

A further advantage is in the fact that the machine is self-supporting, and it may thus be moved without difficulty, and easily coupled and uncoupled from the wagon or rack.

To prevent undue sagging of the middle portions of the elevator slats $s\ s$, which are of course quite long, the elevator is provided with one or more intermediate guides $E''''$, mounted on transverse supports $E'\ E''$. The ends of the guide should be curved downwardly as shown, to prevent the possibility of the elevator catching on it.

Having thus described my invention, I claim:

1. In a hay-loader, the combination of the cylinder C, having picker shafts $C'\ C'$ with flattened ends, and the heads D D having an annular groove therein with which said shaft ends engage, with an enlargement in said groove near the upper side to permit the shafts to partially rotate.

2. In a hay-loader, the combination with a rake substantially as described, of the lift-rod $v$, the tension-rod and spring $v'\ v''$, the lever W, and means for moving and locking the same in different positions.

3. In a hay-loader, the combination of the sprocket-chains S, the carrier strips $s\ s$, and the fastening loop of thin metal $s'$, substantially as described.

In testimony whereof I affix my signature in presence of two witnesses.

SAMUEL FERGUSON.

Witnesses:
L. A. ST. JOHN,
JOS. KUBICEK.